Patented July 5, 1949

2,475,368

UNITED STATES PATENT OFFICE 2,475,368

STABILIZED SODIUM DIACETATE

Hans F. Bauer and Elmer F. Glabe, Chicago, Ill., assignors, by mesne assignments, to Stein, Hall & Co., Inc., a corporation of New York No Drawing. Application December 26, 1942, Serial No. 470,284

2 Claims. (Cl. 260—541)

This invention relates to the stabilization of chemical compositions but more particularly to the preparation of stabilized compositions comprising as one of the active essential ingredients a complex acetate salt containing combined but undissociated acetic acid.

One of the objects of the invention is to provide new and improved compositions containing complex acetate salts, such as, for example, sodium diacetate, which are relatively stable and can be shipped or stored.

Another object of the invention is to provide new and improved compositions comprising complex acetate salts containing combined but undissociated acetic acid together with a water soluble stabilizing agent therefor, whereby said compositions can be shipped or stored and can be dissolved in liquids without leaving an undesirable residue.

Another object of the invention is the provision of compositions of the type described which are suitable for addition to either solid or liquid food products for inhibiting or retarding the growth of rope, mold, or other micro-organisms, or for other specific purposes.

Another object of the invention is the provision of a new and improved method for preparing compositions of the type described. Other objects will appear hereinafter.

In accomplishing these objects in accordance with this invention it has been found that complex acetate salts containing combined but undissociated acetic acid, such as, for example, sodium diacetate, can be stabilized by the addition thereto of one or both of two classes of chemical compounds, namely (a) soluble, normally solid, acidic compounds, and (b) insoluble, normally solid, neutral compounds. The terms "soluble" and "insoluble" are used herein to describe solubility in water at ordinary temperatures, say 75° F.

If the composition is to be employed in a food product it is also essential that the stabilizing agent be edible or non-toxic. The preferred stabilizing agents are readily available, inexpensive, inorganic compounds. Where it is desired that the composition be entirely soluble, the class (a) type of compounds are used, and where solubility of the composition is immaterial either or both types are used. The stabilizing agent should also be one which is non-hygroscopic.

Of the water soluble stabilizing agents, particular mention may be made of sodium dihydrogen phosphate ($NaH_2PO_4.H_2O$), which is also sometimes referred to as a monobasic phosphate or monosodium orthophosphate, dihydrogensodium phosphate or sodium biphosphate. The corresponding potassium and ammonium salts may also be used, as well as other water soluble acidic inorganic phosphorous compounds, especially the phosphates (ortho or meta) and the phosphites. Other examples of compounds which may be employed in class (a) are sodium bisulphite ($NaHSO_3$), sodium bitartrate ($NaHC_4H_4O_6.H_2O$), sodium bisulphate ($NaHSO_4.H_2O$)

and the corresponding potassium compounds.

Of the class (b) compounds, particular mention may be made of calcium sulphate. Other compounds in this class are calcium carbonate and magnesium carbonate. Other types of insoluble compounds may be employed in conjunction with the class (b) type of stabilizing agent as, for example, corn starch, tapioca flour, potato starch, and other starches and flours.

The invention will be further illustrated but is not limited by the following examples in which the percentages are stated in percentages by weight unless otherwise indicated.

Example I

A completely soluble stabilized composition was prepared by mixing together in substantially dry solid form the following ingredients:

| | Per cent |
|---|---|
| Sodium diacetate | 95 |
| Monosodium dihydrogen phosphate | 5 |

The resultant blend was found to be particularly suitable for the inhibition of bacteria and mold growth and development in malt syrup, fountain syrups, such as orange, root beer, Coca-Cola, and cream soda, syrups used in making the corresponding beverages, maple syrup, corn syrup, and also as an addition agent for pickle brines, coating compositions used in the manufacture of grease-proof paper, as well as an ingredient of meats and as a coating agent for various types of meats, including sausage, hams, and the like. This composition is also suitable for the addition to the ingredients in the making of bread, cakes, and other pastry products to inhibit the growth of rope, mold, or for other specific purposes.

In the foregoing example the proportion of sodium dihydrogen phosphate was varied within the range of 1% to 25% with effective results in the stabilization of the resultant composition. Larger amounts can also be employed, but in most instances are not necessary.

Example II

A blend was prepared by mixing together the following solid ingredients:

| | Per cent |
|---|---|
| Sodium diacetate | 70 |
| Corn starch | 20 |
| Calcium sulphate (CaSO$_4$.2H$_2$O) | 10 |

This blend is an example of a stabilized complex acetate composition in which the stabilizing agent is an insoluble substantially neutral substance. The corn starch in the blend can be omitted with a corresponding increase in the amount of sodium diacetate. However, relatively inert materials, such as corn starch, wheat starch, potato starch, dextrines, and the like, are preferably used in compositions of this type and tend to act as acid absorbing agents.

This type of composition was found to be suitable for shipment and storage and was particularly useful as an ingredient of ground meats, such as sausage, of pastry products, such as bread and cake, of coating compositions for the treatment of greaseproof paper which is to be used as a wrapping paper for food products, and of coating compositions for the treatment of encased meat products, such as sausages, and the like.

Example III

A blend was prepared as in Example II except that the percentages of the ingredients were as follows:

| | Per cent |
|---|---|
| Sodium diacetate | 70 |
| Calcium sulphate | 15 |
| Corn starch | 15 |

This blend was employed for similar purposes to those described in Example II.

Example IV

A blend was prepared as in Example II except that the ingredients consisted of:

| | Per cent |
|---|---|
| Sodium diacetate | 60 |
| Calcium sulphate | 20 |
| A 60% water soluble corn dextrine | 20 |

This blend was employed for purposes similar to those described for Example II.

The proportion of the stabilizing agent may vary to some extent, but in most cases will be greater than 1% by weight of the total composition while forming a minor proportion or less than 50% by weight of the composition.

The blending of the solid ingredients of the composition is effected in any convenient manner by the use of a suitable blending or mixing apparatus preferably at ordinary temperatures and under substantially dry conditions. If moisture is added during the blending operation, a further drying operation is normally required to place the composition in a pulverant condition.

While the invention has been described specifically with reference to sodium diacetate because this is practically the only salt of this type available commercially today, it is also applicable to other complex acetate salts of a similar nature. A number of sodium acetate-acetic acid-water systems are known to exist, as mentioned by Beilstein, 4th ed., vol. II, page 107. Solid salts containing combined but undissociated acetic acid can be prepared containing from say 20% to 40% available undissociated acid, but an acid sodium salt of acetic acid containing from about 25% to 35% of available undissociated acid is preferred for the purpose of this invention. The sodium diacetate now available commercially is said to contain 33% to 35% available acetic acid with a pH in 10% solution within the range of 4.5 to 5.5. The invention is also concerned with other complex acetate salts containing combined but undissociated acetic acid but particularly the non-toxic water soluble complex salts, for instance the alkali metal (e. g., sodium, potassium) salts.

The present invention makes possible the shipment and storage of complex acetate salts which heretofore presented a difficult problem due to their instability. As previously indicated, the completely soluble stabilized compositions of Example I, as well as the stabilized compositions of Examples II, III and IV, which contain some insoluble ingredients, have a wide number of uses, and in some cases either type of composition may be employed. While the scope of the invention is limited to the preparation of stabilized complex acetate compositions, it will be understood that the invention is not limited to a particular use of these compositions. Thus the invention is applicable to the preparation of compositions which are sold in dry form and which, when dissolved in water, are completely soluble and can be used as a condiment as a substitute for vinegar in any and all of the conventional uses for vinegar. The invention is also applicable in the preparation of compositions prepared for special purposes, such as for bactericidal, germicidal, antiseptic, preservative or mold inhibiting compositions. These compositions are of special importance in the preparation of foods, either by incorporation therein or by application thereto in the form of a coating, and also beverages including, for example, fruits, vegetables, milk, beer, butter, cheese, pickles, kraut, jellies, fountain syrups, other types of syrups, meat and, generally, foodstuffs of all kinds. They may also be used in or as a coating for paper, textiles, wood, and leather, as well as in adhesives. The stabilized compositions may contain in addition to or in place of starch other relatively inert materials, such as gums, e. g., agar-agar, locust bean gum, or other natural gums, methyl cellulose, protein-containing compositions, such as gelatin, soy bean meal or flour, cereal binders or powdered milk, and other materials of a similar nature.

The proportions of the stabilized compositions which may be incorporated or added to various types of foods or other materials, as described above, may vary depending upon the particular food or material to which these compositions are added and upon the particular purpose. In general, only a minor proportion of the stabilized composition is employed. When the stabilized compositions are used as bactericidal and mold inhibiting compositions as little as .1% based on the weight of the article treated may be effective. In the case of foods, beverages, syrups, or the like, the amount used may be governed somewhat by the taste characteristic factor. Thus, in beverage syrups the taste characteristics are not ordinarily altered by stabilized compositions such as described in Example I in amounts less than 1½% and, at the same time, amounts within the range from .5% to 1½% are effective for mold inhibition in all of the beverage syrups or other liquid compositions mentioned in Example I. Where taste is not a factor, larger proportions of the stabilized compositions may be employed but are not ordinarily necessary where the compositions are used as preservatives.

The stabilized compositions described are also especially useful in the preparation of "cold water paints" particularly those of a substantially neutral or acidic type, including paints of this type having a casein or other protein base. The compositions of the class (a) type are preferred for this purpose, e. g., those of Example I, and are effective when employed in minor proportions, say .5% to 10% by weight of the total quantity of solids normally present in the paint.

Having thus described the invention, what we claim as new and desire to secure by Letters Patent of the United States is:

1. A composition of matter comprising 60 to 70% sodium diacetate, the remainder being calcium sulphate and corn starch, the amount of calcium sulphate being at least 10% by weight of the composition.

2. A composition consisting of 70% sodium diacetate, 20% corn starch and 10% calcium sulphate.

HANS F. BAUER.
ELMER F. GLABE.

REFERENCES CITED

The following references are of record in the file of this patent:

UNITED STATES PATENTS

| Number | Name | Date |
|---|---|---|
| 2,271,756 | Bauer | Feb. 3, 1942 |

OTHER REFERENCES

Kirby et al., in Cereal Chemistry, vol 12, No. 5, May 1935, page 251.

Seidell, "Solubilities of Inorganic and Organic Compounds," 1919, ed. 2, vol. 1, page 626. Pub. by Van Nostrand, N. Y.

Röhr Malting Co., "A Century of Progress in Malting and Brewing," Supplementary pages 11 and 12.